United States Patent
Freyman

(10) Patent No.: US 7,212,502 B2
(45) Date of Patent: May 1, 2007

(54) METHOD AND APPARATUS FOR DYNAMICALLY ADAPTING TELEPHONY ANALOG LOSS BASED ON CHANNEL CONTENT

(75) Inventor: Phillip Kent Freyman, Elgin, IL (US)

(73) Assignee: General Instrument Corporation, Horsham, PA (US)

( * ) Notice: Subject to any disclaimer, the term of this patent is extended or adjusted under 35 U.S.C. 154(b) by 381 days.

(21) Appl. No.: 10/215,080

(22) Filed: Aug. 8, 2002

(65) Prior Publication Data
US 2004/0028216 A1    Feb. 12, 2004

(51) Int. Cl.
*H04B 3/20*    (2006.01)
(52) U.S. Cl. .................... 370/288; 379/399.01
(58) Field of Classification Search ............. 370/201, 370/282, 284, 286, 287, 288, 289, 290, 352, 370/401, 463, 493, 526; 375/219, 220, 221, 375/222; 379/390.01, 390.04, 398, 399.01, 379/399.02, 402
See application file for complete search history.

(56) References Cited

U.S. PATENT DOCUMENTS

| | | | | |
|---|---|---|---|---|
| 4,351,060 A | * | 9/1982 | Treiber | 375/230 |
| 4,381,561 A | * | 4/1983 | Treiber | 370/294 |
| 5,177,734 A | * | 1/1993 | Cummiskey et al. | 370/290 |
| 5,274,703 A | * | 12/1993 | Haughton et al. | 379/401 |
| 5,999,612 A | * | 12/1999 | Dunn et al. | 379/212.01 |
| 6,229,846 B1 | * | 5/2001 | Lassig et al. | 375/222 |
| 6,317,494 B1 | * | 11/2001 | French et al. | 379/399.01 |
| 6,549,587 B1 | * | 4/2003 | Li | 375/326 |
| 6,735,302 B1 | * | 5/2004 | Caine et al. | 379/405 |

OTHER PUBLICATIONS

Application Note, Using the T8533/T8534 Quad Programmable Codec and Echo Canceller, Agere Systems, pp. 1-24, Jun. 2002.*
Application Note, Using the T8533/T8534 Quad Programmable Line Card Signal Processor, Agere Systems, pp. 1-24, May 2001.*
Application Note, Using the T8538B Quad Programmable Codec, Agere Systems, pp. 1-14, Sep. 2001.*

* cited by examiner

*Primary Examiner*—Frank Duong
(74) *Attorney, Agent, or Firm*—Benjamin D. Driscoll

(57) ABSTRACT

A method is provided for introducing analog loss to an information-bearing signal being transmitted to or from end-user terminal equipment over a communication system such as a cable network The method begins by establishing a communication path to the terminal equipment over the communication system and then introducing a level of loss into the communication path to reduce echo. The level of loss that is introduced is based on the information content of the information-bearing signal.

42 Claims, 2 Drawing Sheets

METHOD AND APPARATUS FOR DYNAMICALLY ADAPTING TELEPHONY ANALOG LOSS BASED ON CHANNEL CONTENT

FIELD OF THE INVENTION

This invention relates generally to a method and apparatus for implementing an adaptive analog loss plan to optimize channel performance in a communication system, and more particularly to a method and apparatus for implementing an analog loss plan in which the loss is determined in accordance with the content of the traffic being transmitted over the communication system.

BACKGROUND OF THE INVENTION

Various standards have been proposed to allow transparent bi-directional transfer of Internet Protocol (IP) traffic between the cable system headend and customer locations over an all-coaxial or hybrid-fiber/coax (HFC) cable network. Two such sets of standards have been developed, the first by the Cable Television Laboratories (CableLabs) under the PacketCable project designation, which is commonly referred to as "PacketCable." The second standard has been developed by the European Telecommunications Standards Institute (ETSI) and is referred to as IPCablecom, TS 101 909 Digital Broadband Cable Access to the Public Telecommunications Network; IP Multimedia Time Critical Services. Among other things, these sets of standards specify a scheme for service flow for real-time services such as packet telephony. Packet telephony may be used to carry voice between telephones located at two endpoints. Alternatively, packet telephony may be used to carry voice-band data between endpoint devices such as facsimile machines or computer modems.

Today, access to the Internet is available to a wide audience through the public switched telephone network (PSTN). Typically, in this environment, a user accesses the Internet though a full-duplex dial-up connection through a PSTN modem, which may offer data rates as high as 56 thousand bits per second (56 kbps) over the local-loop plant.

However, in order to increase data rates (and therefore improve response time), other data services are either being offered to the public, or are being planned, such as data communications using full-duplex cable television (CATV) modems, which offer a significantly higher data rate over the CATV plant than the above-mentioned PSTN-based modem. Services under consideration by cable operators include packet telephony service, videoconference service, T1/frame relay equivalent service, and many others.

When providing any of the aforementioned services over a cable network it is necessary to reduce the level of echo signals that are present on the transmission paths. The echo signals, which are unavoidably present in each path between end users, are primarily echoes of the far end user's voice or voice-band data signals. These echo signals are carried on the transmission path to the receive end user and are reduced there based upon a so-called fixed analog loss plan. The fixed loss plan provides that a predetermined fixed amount of loss be present in the transmit and receive paths. The particular amount of loss depends on the standards to which the cable network conforms. For example, Cable Television Laboratories specifies analog loss plan of 4 dB in both the transmit and receive directions. On the other hand, the ETSI Guide specifies an analog loss plan of 4 dB in the transmit direction and 11 dB in the receive direction.

The need to reduce echo also arises in the context of the PSTN itself. In this case the loss plan is generally specified by the regional telephone companies and typically depends on whether the call is intra-office, intra-exchange (local), intra-LATA (toll) or inter-LATA (toll).

Given the wide variety of services to be deployed over various communication systems, it would be desirable to provide a loss plan that better optimizes the quality of service that can be offered by them.

SUMMARY OF THE INVENTION

The present invention provides a method for introducing analog loss to an information-bearing signal being transmitted to or from end-user terminal equipment over a communication system. The method begins by establishing a communication path to the terminal equipment over the communication system and then introducing a level of loss into the communication path to reduce echo. The level of loss that is introduced is based on the information content of the information-bearing signal.

In accordance with one aspect of the invention, a greater amount of loss is introduced for voice content than for voice-band data content.

In accordance with another aspect of the invention, the communication system is a cable network. In some cases the cable network may be a hybrid-fiber/coax cable network. In other cases the communication system may be a public-switched telephone network.

In accordance with yet another aspect of the invention the communication path supports packet telephony.

In accordance with another aspect of the invention, the communication path maybe a receive path to the terminal equipment, a transmit path from the terminal equipment, or both a receive and transmit path.

In accordance with another aspect of the invention, an apparatus is provided for attenuating an information-bearing signal being transmitted to or from end-user terminal equipment over a communication system. The apparatus includes a content detector for sampling the information-bearing signal to distinguish between voice content and voice-band data content and generating a control signal in response thereto. An attenuator circuit is also provided for introducing a selective level of loss into a communication path in which the information-bearing signal travels. The apparatus also includes a controller that couples the content detector to the attenuator circuit and selects the selective level of loss introduced by the attenuator circuit in response to the control signal.

In accordance with another aspect of the invention, a computer readable medium is provided for attenuating an information-bearing signal being transmitted to or from end-user terminal equipment over a communication system. The computer readable medium contains program instructions that, when loaded into a processor, cause the processor to perform the steps of: sampling the information-bearing signal to distinguish between voice content and voice-band data content and generating a control signal in response thereto; selecting a selective level of loss based on the control signal; and introducing the selective level of loss into a communication path in which the information-bearing signal travels.

DETAILED DESCRIPTION

The present inventor has recognized that the analog loss plan employed in a communication system such as a cable network or the public switched telephone network (PSTN) effectively requires a tradeoff in the quality of service offered for voice traffic and voice-band data traffic. That is, loss plans are generally fixed regardless of the nature of the content of the traffic. In many cases, however, the quality of service may be enhanced by changing the level of loss based on whether the traffic is voice or voice-band data. Accordingly, as described in more detail below, in the present invention an analog loss plan is provided in which the level of loss is dynamically changed based on the content of a call. The level of loss may be adjusted in the receive path, the transmit path, or both paths. While the loss plan will be described in terms of a cable network, the dynamically adjustable loss plan is equally applicable to other communication networks such as a PSTN.

Figure 1:
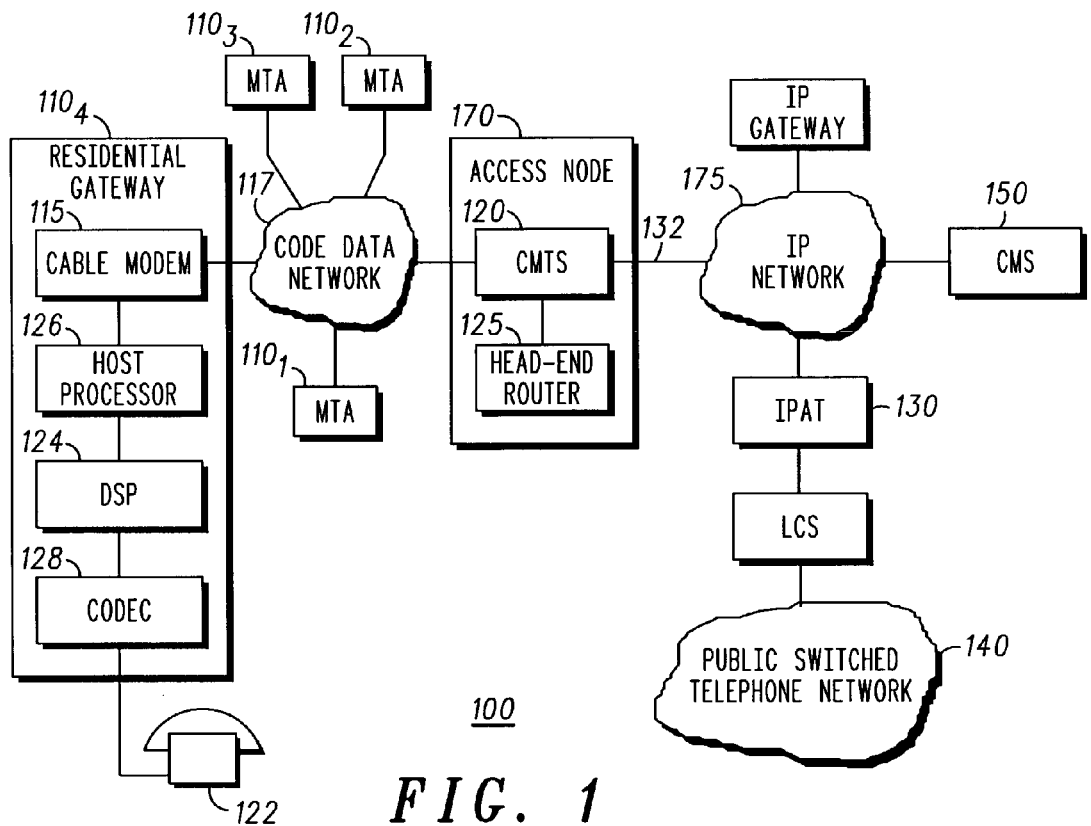
FIG. 1 shows an illustrative communications system embodying the principles of the invention.

An illustrative communications system embodying the principles of the invention is shown in FIG. 1. Other than the inventive concept, the elements shown in FIG. 1 are well known and will not be described in detail.

As noted above, communications system 100 is representative of a network architecture in which subscribers associated with subscriber gateways or Media Terminal Adapters (MTAs) $110_1$–$110_4$ may access the Internet 175 and a Public Switched Telephone Network (PSTN) 140. In particular, MTAs $110_1$–$110_4$ are in communication with the Internet 175 via a CATV network. Cable TV network access is provided by an MSO (Multi-Service Operator) (not shown). in this context, it is assumed the MSO provides (besides the traditional CATV access network facilities exemplified by communications network 117) Access Node 170 and cable modem 115. This CATV network arrangement is also referred to herein as a cable data network. CATV network is typically an all-coaxial or a hybrid-fiber/coax (HFC) cable network. MTAs $110_1$–$110_4$ is also in communication with PSTN 140 via the cable network, IP network 175, and IP Access terminal (IPAT) 130.

As shown in FIG. 1 for MTA $110_1$, the MTAs $110_1$–$110_4$ include customer premises equipment 122, e.g., terminal equipment such as a telephone or facsimile machine, a codec 128, a Digital Signal Processor (DSP) 124, host processor 126 and Cable Modem (CM) 115. Terminal equipment 122, codec 128, DSP 124, and host processor 126 are collectively representative of data terminal equipment, which is coupled to communications link 117 via CM 115. CM 115 provides the access interface to the cable data network via an RF connector and a tuner/amplifier (not shown). Broadly speaking, DSP 124 generates data packets from the analog signals received from the telephone 122. That is, DSP 124 and codec 128 collectively perform all of the voice band processing functions necessary for delivering voice and voice-band data over a cable network, including echo cancellation, packet loss concealment, call progress tone generation, DTMF/ pulse and fax tone detection, audio compression and decompression algorithms such as G.723 and G.729, packet dejittering, and IP packetization/depacketization. Typically, DSP 124 encodes the data with pulse code modulated samples digitized at rates of 8, 16 or 64 kHz. Host processor 126 receives the data packet from the DSP 124 and adds an appropriate header, such as required by the MAC, IP, and UDP layers. Once the packet is complete, it is sent to CM 115, where it remains in a queue until it is transmitted over the cable data network to the CMTS 120 in the CATV headend 170. If the service being provided is a real-time service such as packet telephony, for example, the data packets should be formatted in accordance with a suitable protocol such as the Real-Time Transport Protocol (RTP).

An Internet Service Provider (ISP) provides Internet access. In the context of FIG. 1, it is assumed an ISP provides IP network 175, which includes a cable data network access router (not shown) attached to communications link 132. It should be noted that for illustrative purposes only it is assumed that the above-mentioned MSO and ISP Service provider are different entities even though this is not relevant to the inventive concept.

CM 115 is coupled to Access Node 170 via cable network 117, which is, e.g., a CATV radio-frequency (RF) coax drop cable and associated facilities. Access Node 170 provides services to a plurality of downstream users (only one of which is shown) and comprises cable modem data termination system (CMTS) 120 and head-end router 125. (CMTS 120 may be coupled to head-end router 125 via an Ethernet 100BaseX connection (not shown).) CMTS 120 terminates the CATV RF link with CM 115 and implements data link protocols in support of the service that is provided. Given the broadcast characteristics of the RF link, multiple customers and, hence, potentially many LANs may be serviced from the same CMTS interface. (Also, although not shown, it is assumed that the CATV network includes a plurality of Access Nodes.)

CM 115 and CMTS 120 operate as forwarding agents and also as end-systems (hosts). Their principal function is to transmit Internet Protocol (IP) packets transparently between the CATV headend and the customer location. The above noted standards have been prepared as a series of protocols to implement this functionality.

In a full voice-over-Internet communication system, a Call Management Server (CMS) 150 is the hardware or software component that provides the telephony intelligence in the communications system and is responsible for telephone call processing. In particular, CMS 150 is responsible for creating the connections and maintaining endpoint states required to allow subscribers to place and receive telephone calls, to use features such as call waiting, call forwarding and the like. In theory this invention can also apply to a switched IP communication system in which an IP digital terminal connected to a CLASS5 telephony switch substitutes for the CMS and IPAT. In this system, IP-based call signaling is conducted between MTA and IPDT and GR303 or V5.2 call signaling is conducted between IPDT and telephony switch. In this system IP voice traffic voice traffic is conducted between MTA and IPDT.

As previously mentioned, MTAs $110_1$–$110_4$ include circuitry for implementing a loss plan to reduce the level of echo. Conventional loss plans do not distinguish among the nature of the content of the traffic being communicated. However, the level of loss that is optimal for voice traffic is not necessarily the same as the level of loss that is optimal for voice-band data traffic. For example, the present inventor has recognized that the amount of loss that is optimal for voice-band data traffic is generally less than the amount of loss that is optimal for voice traffic. Accordingly, it would be advantageous to vary the amount of loss that is introduced based on the content of the traffic. In the case of voice and voice-band data, for example, it will generally be advantageous to provide a lesser amount of loss for the voice-band data traffic than for the voice traffic. By continuously monitoring the content the analog loss can be optimized for the content on the transmission path in real time as the content changes. In this way there is no need to accept performance tradeoffs and the end user can be provided with the highest level of service regardless of the content being transmitted. That is, with the present invention both voice quality and modem connect speeds can be enhanced or even maximized.

Figure 2:
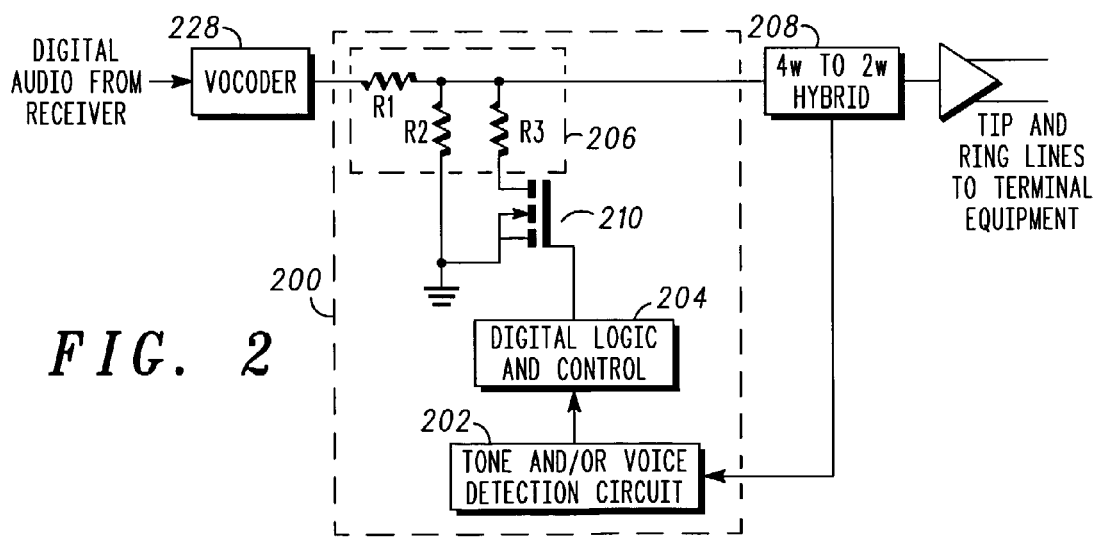
FIG. 2 shows one embodiment of an attenuation network for implementing a dynamically adjustable level of loss in accordance with the present invention.

FIG. 2 shows one embodiment of an attenuation network for implementing a dynamically adjustable level of loss in accordance with the present invention. In the communication network depicted in FIG. 1 the attenuation will generally be provided in each of the MTAs $110_1$–$110_4$. The loss may be imparted on the digital signal at a point along its path between the cable modem 115 and codec 128 or it may be imparted on the analog signal received from (or transmitted to) the terminal equipment 122. In the embodiment of the invention shown in FIG. 2, the loss is imparted on the analog signal received from a far end user after being processed by the codec 228. In operation, the attenuation network 200 determines whether a voice-band data call or a voice call has been established. In the case of a voice call the loss is set to some pre-established level. In the case of a voice-band data call the amount of loss is reduced to better optimize transmission of the voice-band data by, for example, increasing modem connect rates, which may otherwise be reduced at high loss levels.

For example, in the case of the aforementioned ETSI Guide, a loss of 4dB is specified in the transmit direction and 11 dB in the receive direction. While this loss plan may be optimal for voice traffic, it is not optimal for voice-band data. Accordingly, upon detection of voice-band data, the present invention may be reduce the loss in the receive direction to a level somewhere between 11 and 4 dB.

Attenuation network 200 includes a content detector 202, a control circuit 204, and an attenuator circuit 206. Content detector 202 samples the analog signal received from the codec 228 to determine if the signal is a data signal (e.g, a modem tone) or a voice signal. In some relatively simple implementations, content detector 202 may be an RLC or other tuned circuit that is used to detect the presence or absence of a modem tone. In other implementations the content detector 202 may detect the presence or absence of voice traffic. In general, the present invention encompasses content detectors that distinguish between voice and voice-band data by any appropriate means, including, but not limited to, either the detection of a modem tone, a voice signal or both. In the embodiment of the invention shown in FIG. 2, the analog signal is sampled from the 4-wire to 2-wire hybrid network 208, which converts the 2-wire audio line from the terminal equipment into separate send and receive paths in a 4-wire audio to the codec 228. However the content detector 202 may sample the signal at any appropriate point in the MTA between the cable modem and the terminal equipment. Accordingly, the signal that is sampled may be either a digital signal or an analog signal.

Once the content detector 202 has determined whether the call is a voice or voice-band data call it communicates the result to the control circuit 204, which in turn adjusts the level of attenuation imparted by the attenuator circuit 206. The particular attenuator circuit shown in FIG. 2 employs a resistor network with three resistors R1, R2 and R3 and can provide two levels of attenuation depending on whether R3 is placed in parallel with R2. The lower level of attenuation is determined by the ratio of R1 to R2 and the higher level of attenuation is determined by the ratio of R1 to R2/R3. A transistor 210 serves as a switch that inserts and removes R3 from the resistor network under the control of the control circuit 204. When a call supporting voice traffic is in progress, the transistor 210 is switched so that R3 is placed in parallel with R2. When a call supporting voice-band data traffic is in progress, the transistor is switched so that R3 is removed from the circuit. Of course, the attenuator circuit can provide additional levels of attenuation by increasing the number of resistors in the resistor network. Moreover, the transistor 210 may selected from any transistor technology, including bipolar, FET or MOSFET transistors. More generally, instead of transistor 210, any switching device may be used to adjust the overall resistance of the attenuator circuit 206, including mechanical relays, analog transmission gates and the like.

Figure 3:
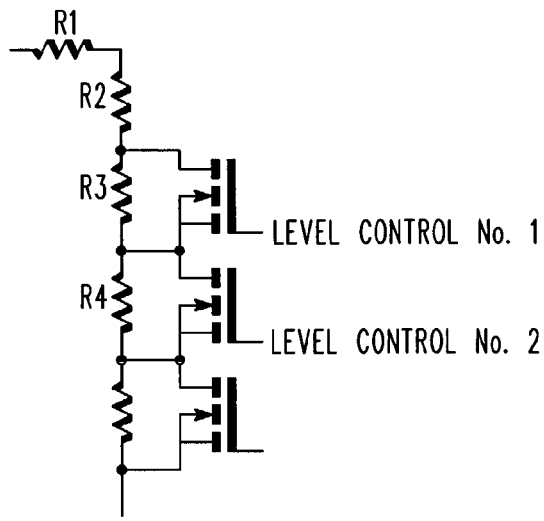
FIG. 3 shows an alternative embodiment of the resistor network employed in the attenuator network depicted in FIG. 2.

The resistor network employed in the attenuator circuit 206 may be more complex than that depicted in FIG. 2. For example, FIG. 3 shows a resistor ladder that can comprise any number of resistors to provide any number of levels of resistance. An appropriate arrangement of switches placed across the resistors in the resistor ladder can select the particular resistance of the resistor network that is needed to achieve the desired level of attenuation. The resistor ladder can be realized with discrete components or solid-state devices.

Figure 4:
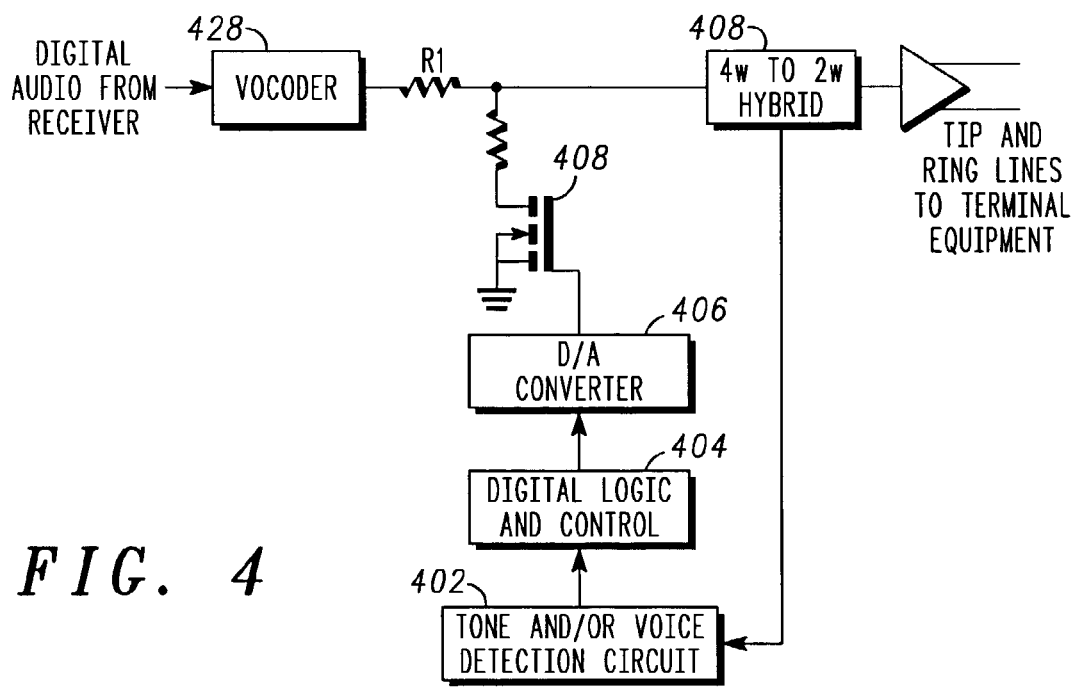
FIG. 4 shows an alternative embodiment of the attenuation network depicted in FIG. 2.

In some embodiments of the invention the attenuator network may provide a continuously variable level of attenuation instead of the discrete levels of attenuation provided by the aforementioned resistor network. For example, referring to FIG. 4, in this embodiment the attenuator network may employ a MOSFET transistor 408 operating in its linear mode instead of serving as a switch. A D/A converter 406 receives a signal from the control circuit 404 and generates a varying DC bias that is placed across the gate of the MOSFET 408, which causes the drain-source resistance $r_{ds}$ of the MOSFET to vary. The drain-source resistance $r_{ds}$ may in effect serve as a continuously adjustable resistor that can be used to provide a continuously adjustable level of attenuation. True linear attenuation may be achieved by using a software algorithm to curve fit the MOSFET's $r_{ds}$ curve and to compensate for non-linearities in the $r_{ds}$ performance by modifying the drive level of the D/A converter 406 that is applied to the MOSFET 408.

While the attenuation network has been described above in terms of discrete hardware components, those of ordinary skill in the art will recognize that the attenuation network may be configured in any manner known to those of ordinary skill in the art. For example, it may be implemented with either digital or analog electronics and in hardware or a combination of hardware and software. If implemented in software, the attenuation network maybe in some cases incorporated into the DSP 124 of the MTAs.

The present invention is also applicable to communication networks other than a cable network. For example, the invention may be employed in a PSTN. In this case the invention may be implemented in the line card that serves as the interface between the network switch and the transmission path to the end user.

The invention claimed is:

1. An apparatus for attenuating an information-bearing signal being transmitted to or from end-user terminal equipment over a communication system, said signal having an information content, said apparatus comprising:

a content detector for sampling the information-bearing signal to distinguish between voice content and voice-band data content and generating a control signal in response thereto;

an attenuator circuit for introducing a selective level of loss into a communication path in which the information-bearing signal travels; and a controller coupling the content detector to the attenuator circuit and selecting the selective level of loss introduced by the attenuator circuit in response to the control signal.

2. The apparatus of claim 1 wherein the controller selects a greater amount of loss for voice content than for voice-band data content.

3. The apparatus of claim 1 wherein said communication system is a cable network.

4. The apparatus of claim 3 wherein said communication path supports packet telephony.

5. The apparatus of claim 3 wherein the cable network is a hybrid-fiber/coax cable network.

6. The apparatus of claim 1 further comprising a Media Terminal Adapter (MTA) in which the information-bearing signal is sampled and in which the loss is introduced.

7. The apparatus of claim 1 wherein said terminal equipment includes a telephone.

8. The apparatus of claim 1 wherein said communication system is a public-switched telephone network.

9. The apparatus of claim 1 wherein said communication path is a receive path to the terminal equipment.

10. The apparatus of claim 1 wherein said communication path is transmit path from the terminal equipment.

11. The apparatus of claim 1 wherein said communication path includes a receive and transmit path and wherein the attenuator circuit introduces the loss into at least one of the paths.

12. The apparatus of claim 1 wherein the content detector detects a presence or absence of a data signal.

13. The apparatus of claim 1 wherein the content detector detects a presence or absence of a voice signal.

14. The apparatus of claim 12 wherein the content detector further detects a presence or absence of a voice signal.

15. The apparatus of claim 12 wherein said content detector is a tuned circuit.

16. The apparatus of claim 12 wherein said data signal is a modem tone.

17. The apparatus of claim 1 wherein the information-bearing signal is an analog signal.

18. The apparatus of claim 1 wherein the information-bearing signal is a digital signal.

19. The apparatus of claim 1 wherein the attenuator circuit introduces a level of loss that is selected from a discrete number of levels of loss.

20. The apparatus of claim 19 wherein the discrete number of levels of loss is two.

21. The apparatus of claim 19 wherein the discrete number of levels of loss is a plurality of levels of loss.

22. The apparatus of claim 19 wherein the attenuator circuit includes a resistor network.

23. The apparatus of claim 22 wherein the attenuator circuit further includes a switch for adjusting the resistance of the resistor network in response to the control signal.

24. The apparatus of claim 23 wherein the switch is a transistor.

25. The apparatus of claim 23 wherein the switch is a mechanical relay.

26. The apparatus of claim 20 wherein the switch is an analog transmission gate.

27. The apparatus of claim 21 wherein the attenuator circuit includes a resistor network.

28. The apparatus of claim 22 wherein the resistor network includes a resistor ladder.

29. The apparatus of claim 1 wherein the attenuator circuit introduces a level of loss that is selected from a continuous range of loss levels.

30. The apparatus of claim 29 wherein the attenuator circuit includes: a D/A converter receiving the control signal from the controller and generating an analog control signal in response thereto; and a transistor operational in a linear mode under control of the analog control signal.

31. A computer readable medium for attenuating an information-bearing signal being transmitted to or from end-user terminal equipment over a communication system, said computer readable medium containing program instructions that, when loaded into a processor, cause the processor to perform:

sampling the information-bearing signal to distinguish between voice content and voice-band data content and generating a control signal in response thereto;

selecting a selective level of loss based on the control signal; and introducing the selective level of loss into a communication path in which the information-bearing signal travels.

32. The medium of claim 31 wherein the selecting includes selecting a greater amount of loss for voice content than for voice-band data content.

33. The medium of claim 31 wherein said communication system is a cable network.

34. The medium of claim 33 wherein said communication path supports packet telephony.

35. The medium of claim 33 wherein the cable network is a hybrid-fiber/coax cable network.

36. The medium of claim 31 wherein said terminal equipment includes a telephone.

37. The medium of claim 31 wherein said communication system is a public-switched telephone network.

38. The medium of claim 31 wherein said communication path is a receive path to the terminal equipment.

39. The medium of claim 31 wherein said communication path is transmit path from the terminal equipment.

40. The medium of claim 31 wherein said communication path includes a receive and transmit path and wherein the attenuator circuit introduces the loss into at least one of the paths.

41. The medium of claim 31 wherein the sampling includes detecting a presence or absence of a data signal.

42. The medium of claim 31 wherein the sampling includes detecting a presence or absence of a voice signal.

* * * * *